(12) United States Patent
Camp, Jr. et al.

(10) Patent No.: US 9,451,547 B2
(45) Date of Patent: Sep. 20, 2016

(54) COORDINATED SIGNALING OF SCHEDULING INFORMATION FOR UPLINK AND DOWNLINK COMMUNICATIONS

(71) Applicants: Sony Corporation, Tokyo (JP); Sony Mobile Communications AB, Lund (SE)

(72) Inventors: William O. Camp, Jr., Chapel Hill, NC (US); Jacobus Haartsen, Rolde (NL)

(73) Assignees: Sony Corporation, Tokyo (JP); Sony Mobile Communications Inc., Toyko (JP)

(*) Notice: Subject to any disclaimer, the term of this patent is extended or adjusted under 35 U.S.C. 154(b) by 0 days.

(21) Appl. No.: 15/019,902

(22) Filed: Feb. 9, 2016

(65) Prior Publication Data

US 2016/0165541 A1 Jun. 9, 2016

Related U.S. Application Data

(63) Continuation of application No. 12/609,280, filed on Oct. 30, 2009, now Pat. No. 9,264,184.

(51) Int. Cl.
*H04W 52/02* (2009.01)
*H04W 72/12* (2009.01)
*H04L 5/00* (2006.01)
*H04L 1/18* (2006.01)

(52) U.S. Cl.
CPC ........ *H04W 52/0216* (2013.01); *H04L 1/1854* (2013.01); *H04L 5/0055* (2013.01); *H04W 52/02* (2013.01); *H04W 72/12* (2013.01); *H04W 72/1231* (2013.01); *H04W 72/1263* (2013.01)

(58) Field of Classification Search
CPC .......... H04W 72/12; H04W 72/1263; H04W 52/02; H04W 52/0216
See application file for complete search history.

(56) References Cited

U.S. PATENT DOCUMENTS

| 8,169,957 | B2* | 5/2012 | Damnjanovic ... H04W 52/0216 370/318 |
| 9,264,184 | B2* | 2/2016 | Camp, Jr. ............ H04L 1/1854 |
| 2009/0046650 | A1* | 2/2009 | Dalsgaard ............ H04L 1/1812 370/329 |
| 2010/0238880 | A1* | 9/2010 | Wu .................... H04W 76/048 370/329 |

OTHER PUBLICATIONS

Author Unknown, Proposal of location of PHICH and CCE, 3GPP TSG-RAN WG1#50bis, Doc. No. R1-073940, Oct. 12, 2007, pp. 1-6.*
Author Unknown, Persistent scheduling for DL, 3GPP TSG-RAN WG2 Meeting #61bis, Apr. 4, 2008, pp. 1-6.*

* cited by examiner

*Primary Examiner* — Christopher Crutchfield
(74) *Attorney, Agent, or Firm* — Coats & Bennett, P.L.L.C.

(57) ABSTRACT

A coordinated signaling scheme for both uplink and downlink transmissions between a base station and a user terminal reduces the amount of time that the user terminal must turn on its receiver to listen for scheduling messages and ACK/NACK signaling. A scheduler at a base station aligns the transmission of downlink scheduling messages (e.g., downlink assignments) with uplink grants and ACK/NACK signaling for uplink transmissions. Aligning the downlink scheduling messages with uplink control signaling enables the user terminal to turn off its receiver for longer periods of time.

20 Claims, 9 Drawing Sheets

COORDINATED SIGNALING OF SCHEDULING INFORMATION FOR UPLINK AND DOWNLINK COMMUNICATIONS

RELATED APPLICATIONS

The present application is a continuation of prior U.S. patent application Ser. No. 12/609,280, filed 30 Oct. 2009, the disclosure of which is expressly incorporated herein by reference in its entirety.

BACKGROUND

The present invention relates generally to scheduling transmissions to and from user terminals over shared channels in a mobile communications system and, more particularly, to a coordinated signaling scheme supporting both uplink and downlink transmissions over shared channels designed to reduce current drain in a user terminal.

In mobile broadband communication systems, a plurality of user terminals may share an uplink and/or downlink channel. For example, the developing standard for mobile broadband systems known as Long Term Evolution (LTE) provides two shared channels; one for uplink transmissions and one for downlink transmissions. A scheduler at the base station, referred to in the LTE standard as an Evolved Node B (eNB), determines which user terminals shall have use of the shared channels at any given scheduling interval and which resources the user terminals shall use. Scheduling decisions are typically made once per subframe. Because LTE uses Orthogonal Frequency Division Multiplexing (OFDM), the radio resources may be divided in the frequency domain among two or more user terminals at any given time.

For downlink communications, the user terminals report channel conditions to the scheduler. The scheduler determines which user terminals to serve based on the reported channel conditions and other factors such as buffer levels, quality of service (QoS) requirements, and fairness considerations Data is transmitted to the user terminals on the Physical Downlink Shared Channel; (PDSCH). The identities of the user terminals scheduled to receive data in a given subframe are transmitted to the user terminals in a scheduling message transmitted on a shared downlink control channel, referred to in the LTE standard as the Physical Downlink Control channel (PDCCH). Thus, the user terminals must monitor the PDCCH to determine when they are being scheduled to receive data on the PDSCH. After receiving data on the PDSCH, the user terminal transmits an acknowledgement (ACK/NACK) to the base station on the Physical Uplink Control Channel (PUCCH) to indicate whether the data was successfully decoded. In the case of a NACK, the user terminal continues monitoring the PDCCH for scheduling information relating to the retransmission.

For uplink communications, the LTE standard provides a scheduling request mechanism to enable the user terminal to request resources for uplink transmissions. To request resources, the user terminal transmits a scheduling request (SR) on the PUCCH to the base station, indicating that the user terminal has new data to send. The user terminal then monitors the PDCCH while it waits for an uplink grant (UL-G). Once the UL-G is received, the user terminal transmits data on the assigned resources Because the SR contains no information about the resource requirements of the user terminal, the user terminal attaches a buffer status report (BSR) to the first uplink transmission. After transmitting the data to the base station, the user terminal then monitors the Physical HARQ Indicator Channel (PHICH) for an ACK/NACK of the uplink transmission.

The LTE standards supports an operating mode known as discontinuous reception (DRX) to enable the user terminal to conserve power by turning off some of its radio circuitry. The DRX mode is defined by a DRX cycle, an on-duration, and an inactivity timer. The user terminal wakes up and monitors the PDCCH at the beginning of every DRX cycle for a period equal to the on-duration. If no scheduling message directed to the user terminal is received, the user terminal falls asleep until the beginning of the next DRX cycle. When the user terminal receives a scheduling assignment from the base station, it starts the inactivity timer and continues to monitor the PDCCH until the timer expires.

While the DRX operating mode is intended to save battery power, the amount of actual savings may be disappointing. The lack of coordination between the uplink and downlink scheduling algorithms may prevent, or significantly reduce, potential power savings from DRX operation. When the user terminal is operating in DRX mode, the user terminal may still need to turn on its receiver for uplink operations. For example, when the user terminal requests resources for uplink transmissions, the user terminal turns on its receiver to monitor the PDCCH while waiting for an uplink grant. Further, HARQ operations for uplink communications overrides DRX operations and the user terminal will turn on its receiver to listen for an ACK/NACK message from the base station. Furthermore, when retransmissions are required for previously-sent downlink transmissions, the user terminal must turn on its receiver to listen for downlink scheduling messages.

Because long battery life is a major selling point of mobile communication devices, there is much interest in finding ways to reduce power consumption LTE terminals and other future generation user terminals.

BRIEF SUMMARY

The present invention relates to a coordinated signaling scheme for both uplink and downlink transmissions between a base station and a user terminal that reduces the amount of time that the user terminal must turn on its receiver to listen for scheduling messages and ACK/NACK signaling. The basic idea is to align the transmission of downlink scheduling messages (e.g., downlink assignments) with uplink grants and ACK/NACK signaling for uplink transmissions. Aligning the downlink scheduling messages with uplink control signaling enables the user terminal to turn off its receiver after receiving the downlink scheduling message. Further, the LTE standard specifies that the uplink transmission and ACK/NACK signaling for the downlink transmission must take place four subframes following the uplink grant and downlink scheduling message, respectively. Thus, the transmitter at the user terminal is turned on at the same time to transmit data on the PUSCH and the ACK/NACK signaling on the PUCCH. This synchronization enables the user terminal to turn off its transmitter for longer periods of time.

In some embodiments, the downlink scheduling messages may also be aligned with the ACK/NACK signaling for uplink transmissions. This alignment allows the user terminal to turn off its receiver for a longer period of time after receiving the downlink scheduling message. Also, aligning the downlink scheduling messages for retransmission with the ACK/NACK signaling means that the ACK/NACK signaling for the downlink retransmission will be aligned with the uplink retransmission. Again, this alignment enables the user terminal to turn off its transmitter for longer periods of time.

An exemplary embodiment of the invention comprises methods of scheduling transmissions to a plurality of user terminals over shared uplink and downlink channels. One exemplary method comprises scheduling downlink and uplink transmissions for a plurality of user terminals on shared downlink and uplink traffic channels respectively; transmitting downlink scheduling messages to said user terminals over a shared downlink control channel, said downlink scheduling messages indicating the identities of user terminals scheduled to receive data on the shared downlink traffic channel in corresponding subframes of a radio frame; and aligning transmissions of uplink scheduling grants for one or more of said scheduled user terminals with respective downlink scheduling messages for said scheduled user terminals.

In some embodiments, the method further comprises receiving uplink transmissions from user terminals scheduled to transmit on said shared uplink traffic channel; scheduling retransmissions to user terminals on said shared downlink traffic channel responsive to negative downlink acknowledgements from said user terminals; and aligning transmissions of uplink acknowledgements corresponding to transmissions received on said uplink traffic channel with respective retransmissions to said user terminals on said shared downlink traffic channel.

In some embodiments of the method, scheduling downlink and uplink transmissions for a plurality of user terminals on shared downlink and uplink traffic channels respectively comprises scheduling downlink and uplink transmissions of voice packets.

In some embodiments, the method further comprises further comprising appending data packets for user terminals with concurrent voice and data sessions to scheduled voice packets for respective user terminals by transmitting said data packets for said user terminals with concurrent voice and data sessions in subframes immediately following the transmission of respective voice packets.

In some embodiments of the method, scheduling downlink and uplink transmissions for a plurality of user terminals on shared downlink and uplink traffic channels respectively comprises consolidating downlink transmissions to said user terminals in one or more subframes of a radio frame to create one or more silent subframes in said radio frame.

In some embodiments, the method further comprises sending a silent subframe indication to said user terminals to indicate that one or more subframes of a radio frame will not contain downlink transmissions.

In some embodiments, the method further comprises sending control signals to said user terminals to switch user terminals between a normal operating mode and a power saving operating mode.

In some embodiments, the method further comprises transmitting retransmission window parameters to the user terminals indicating a time period during which downlink retransmissions will be made to the user terminal.

In some embodiments, the method further comprises transmitting random access window parameters to the user terminals indicating a time period during which the base station will listen for random access attempts.

Some embodiments of the invention comprise a base station for scheduling transmissions to a plurality of user terminals over shared uplink and downlink channels. One exemplary base station comprises a transceiver for transmitting user data to a plurality of user terminals over a shared downlink traffic channel and for receiving user data from said user terminals over a shared uplink traffic channel; a control unit including a scheduler for scheduling said downlink and uplink transmissions. The scheduler is configured to send downlink scheduling messages to said user terminals over a shared downlink control channel, said downlink scheduling messages indicating the identities of user terminals scheduled to receive data on the shared downlink traffic channel in corresponding subframes of a radio frame, and to align transmissions of uplink scheduling grants for one or more of said scheduled user terminals with respective downlink scheduling messages for said scheduled user terminals.

In some embodiments of the base station, the scheduler is further configured to schedule retransmissions to user terminals on said shared downlink traffic channel responsive to receipt of negative downlink acknowledgements from said user terminals; and to align transmissions of uplink acknowledgements corresponding to uplink transmissions from said user terminals with respective downlink retransmissions to said user terminals on said shared downlink traffic channel.

In some embodiments of the base station, the downlink and uplink transmissions comprise voice packets.

In some embodiments of the base station, the scheduler is further configured to append data packets for user terminals with concurrent voice and data sessions to scheduled voice packets for respective user terminals by scheduling transmission of said data packets for transmission to said user terminals in subframes immediately following the transmission of respective voice packets for said user terminals.

In some embodiments of the base station, the scheduler is further configured to consolidate downlink transmissions to said user terminals in one or more subframes of a radio frame to create one or more silent subframes in said radio frame.

In some embodiments of the base station, the control unit is further configured to send a silent subframe indication to the user terminals to indicate that one or more subframes of a radio frame will not contain downlink transmissions.

In some embodiments of the base station, the control unit is configured to send control signals to the user terminals to switch user terminals between a normal operating mode and a power save operating mode.

In some embodiments of the base station, the control unit is configured to send retransmission window parameters to the user terminals indicating a time period during which downlink retransmissions will be made to the user terminal.

In some embodiments of the base station, the control unit is configured to send random access window parameters to the user terminals indicating a time period during which the base station will listen for random access attempts.

Other embodiments of the invention comprise methods implemented by a user terminal of receiving downlink retransmission from a base station over a shared downlink traffic channel. One exemplary user terminal method comprises transmitting a negative acknowledgement message to said base station to indicate that a previous downlink transmission was unsuccessful; and intermittently turning a receiver circuit on and off for a fractional portion of each subframe in a defined retransmission window comprising a plurality of subframes to listen for a downlink retransmission.

In some embodiments of the user terminal, the method further comprises turning off the receiver circuit as soon as the decoded control message is determined to not include a downlink packet assignment for that sub-frame.

Other embodiments of the invention comprise user terminals for receiving downlink retransmissions from a base station over a shared downlink traffic channel. One exemplary user terminal comprises a transceiver for receiving said downlink transmission and for transmitting control signal on a uplink channel; a control unit configured to transmit a negative acknowledgment message to said base station to indicate that a previous downlink transmission was unsuccessful and to intermittently turn a receiver circuit on and off for a fractional portion of each subframe in a defined retransmission window comprising a plurality of subframes to listen for a downlink retransmission.

In some embodiments of the user terminal, the receiver is further configured to detect that control message is completed and further detect that a downlink packet will not be sent in that sub-frame, and turn the receiver off.

DETAILED DESCRIPTION

Figure 1:
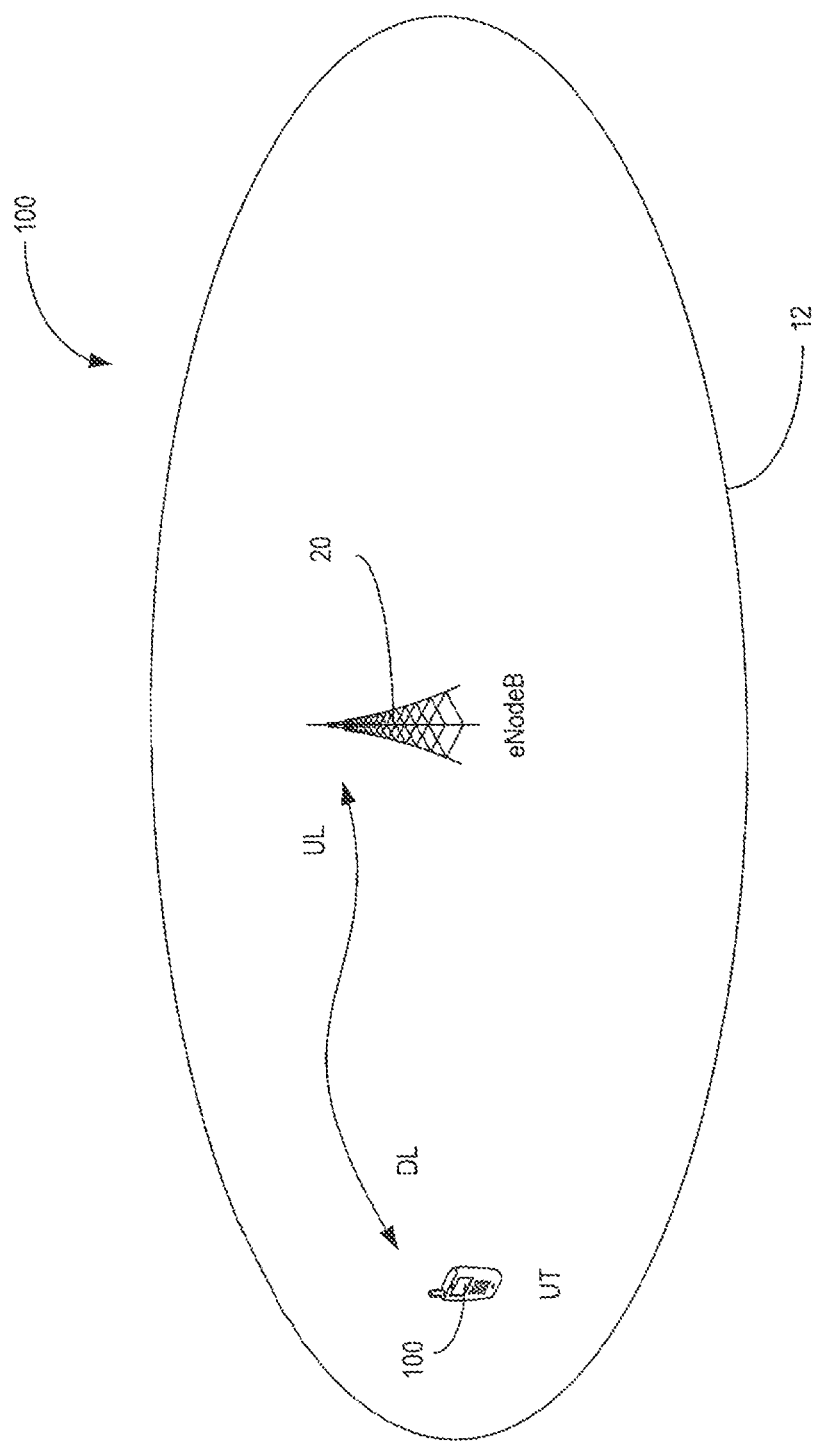
FIG. 1 illustrates an exemplary mobile communication system for broad communications.

FIG. 1 illustrates an exemplary wireless communication network 10 for providing mobile broadband services to one or more user terminals 100. The term user terminal as used herein refers to any portable communication device having the ability to connect wirelessly to a communication network 10. The term user terminal includes, without limitation, cellular phones, smart phones, personal digital assistants, laptop computers, and handheld computers. Wireless communication network 10 includes a plurality of base stations 20 that provide radio coverage within respective cells 12 of the wireless communication network 10. The base station 20 connects to a core network (not shown), which provides access to external packet data networks such as the Internet.

For illustrative purposes, an exemplary embodiment of the present invention will be described in the context of a Long Term Evolution (LTE) system. Those skilled in the art will appreciate, however, that the present invention is more generally applicable to other wireless communication systems, including Wideband Code-Division Multiple Access (WCDMA), WiMax (IEEE 802.16) systems, and future generations of mobile communication systems.

LTE systems provides two shared traffic channels; the Physical Downlink Shared Channel (PDCCH) for downlink transmissions and the Physical Uplink Shared Channel for uplink transmissions. The PDCCH and PUSCH both use an orthogonal frequency division multiplexing (OFDM) carrier. Because LTE uses an OFDM carrier, the radio resources may be divided in the frequency domain among two or more user terminals at any given time.

Figure 2:
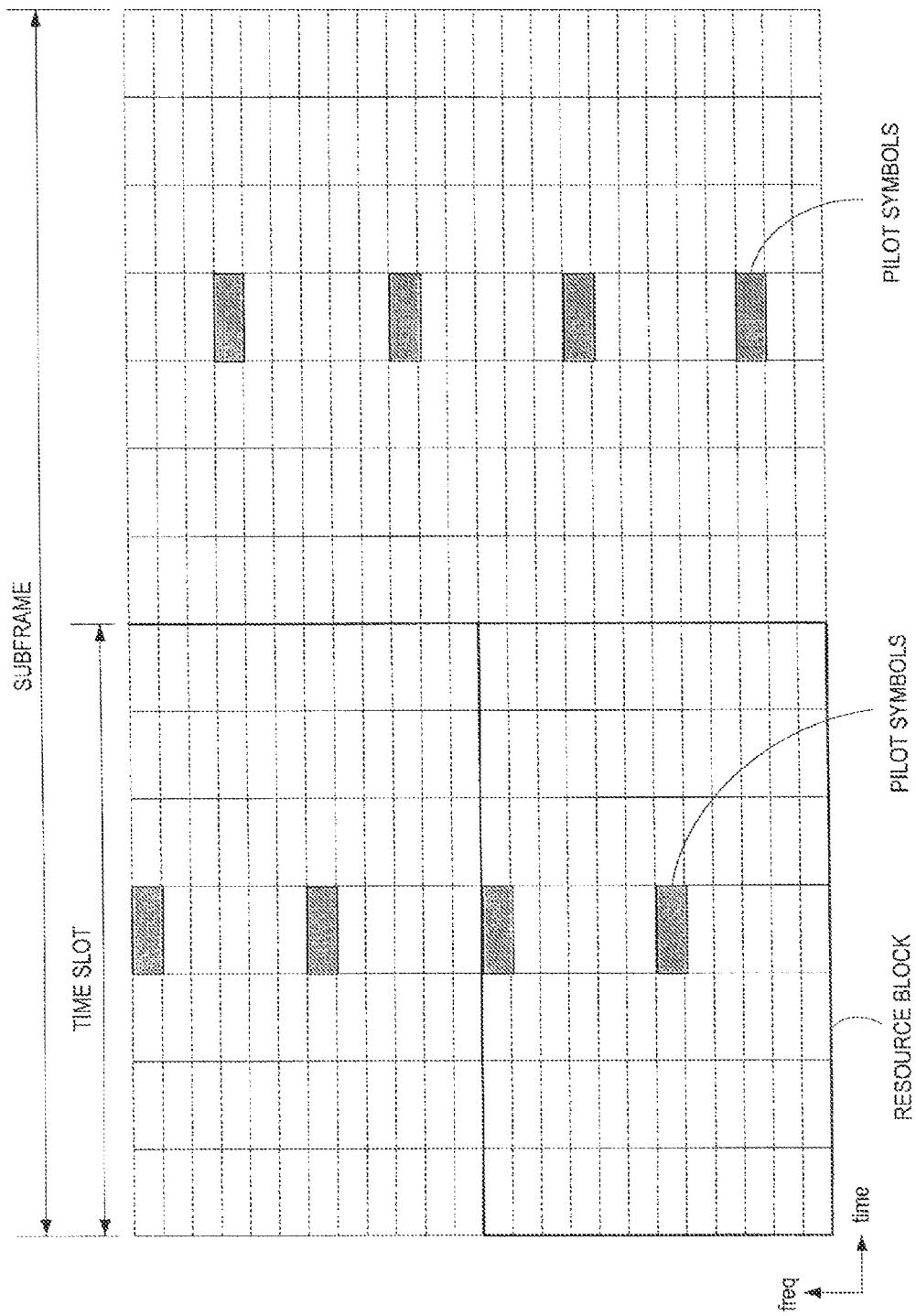
FIG. 2 illustrates the structure of an exemplary subframe in mobile communication system using OFDM.

FIG. 2 illustrates the structure of an exemplary OFDM carrier. The vertical axis in FIG. 2 represents the frequency domain and the horizontal axis represents the time domain. In the frequency domain, the radio resource is divided into a plurality of narrowband subcarriers. A typical OFDM carrier may comprise hundreds or even several thousand subcarriers. In the time domain, the radio resource is divided into time slots. Each time slot comprises a plurality of symbol periods. In this example, a time slot comprises seven (7) symbol periods. One of the symbol periods in each time slot is used to transmit a pilot symbol, which is transmitted on a subset of the available subcarriers in a few known symbol periods. The remaining six symbols in each time slot are used to transmit data and/or control signals. The subcarriers in a time slot may be grouped into units known as resource blocks. For example, the exemplary embodiment disclosed herein, a resource block comprises twelve (12) subcarriers over a period equal to one time slot.

In addition to the shared traffic channels, there are several control channels to support uplink and downlink operations. In the downlink, the base station 20 uses the Physical Downlink Control Channel (PDCCH) to transmit scheduling information and transmission parameters (e.g., modulation and coding scheme (MCS)) to the user terminals 100 for both uplink and downlink operations, and the Physical HARQ Indicator Channel (PHICH) for sending acknowledgements of uplink transmissions. In the uplink, the user terminals 100 transmit uplink scheduling requests (SRs) and send acknowledgements (ACK/NACK) of downlink transmissions on the Physical Uplink Control Channel (PUCCH).

A scheduler at the base station 20 determines which user terminals 100 shall have use of the shared traffic channels at any given time. Scheduling decisions are typically made once per subframe. Additionally, the scheduler determines modulation and coding scheme to be used and whether to use a multiple-input, multiple-output (MIMO) transmission scheme.

Figure 3:
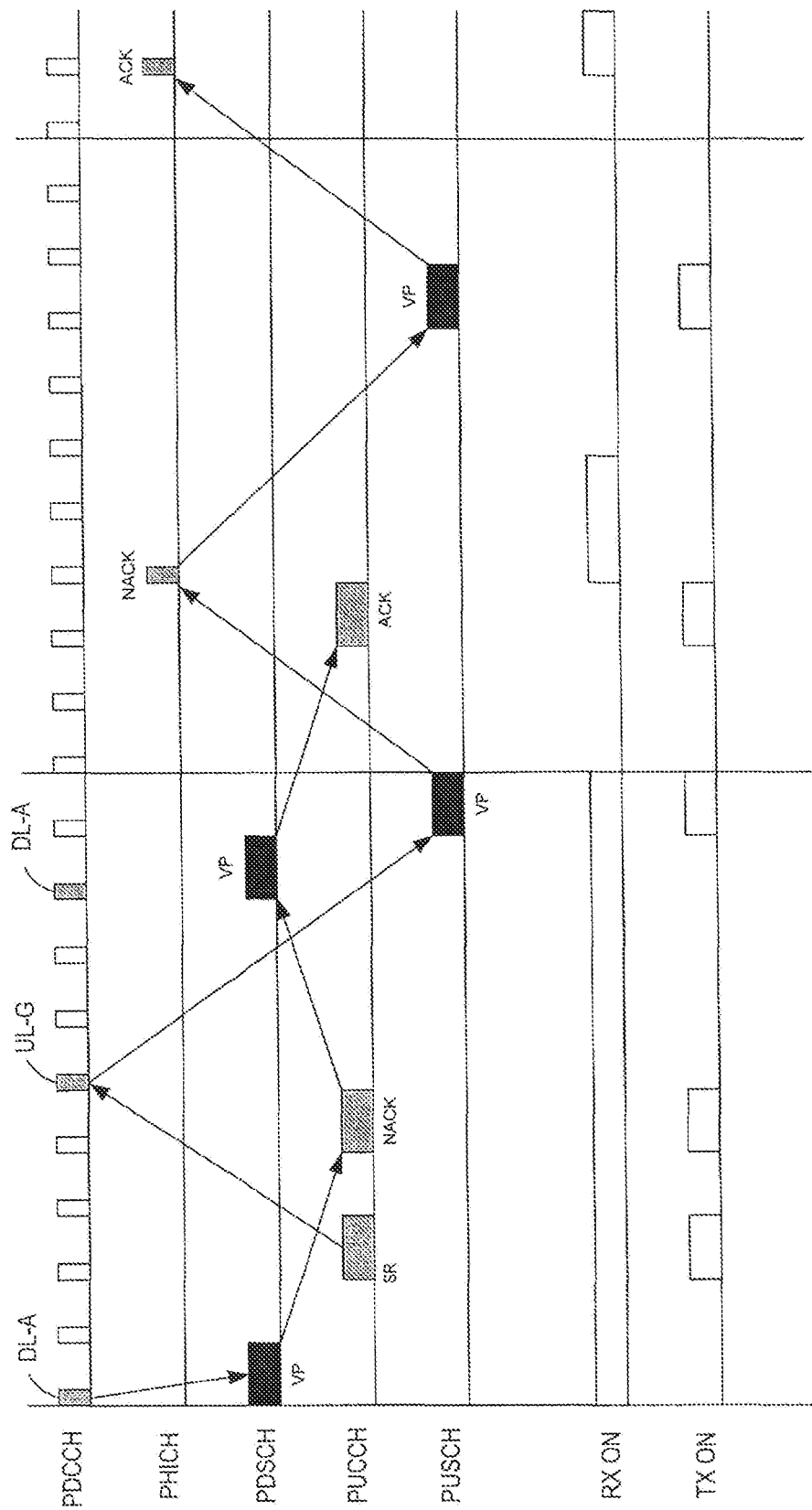
FIG. 3 illustrates typical operations for uplink and downlink communications of a base station and user terminal in a mobile communication system.

FIG. 3 illustrates typical signaling for downlink and uplink transmissions on the PDSCH and PUSCH respectively. In the following examples, it is assumed that the data transmitted comprises voice packets for voice over IP (VoIP)

service. However, the invention is also applicable to all types of packet data transmissions. These examples show the transmission of one speech frame having a period of 20 milliseconds (280 bits) over one radio frame, which contains twenty 1 millisecond subframes. It is assumed that for normal VoIP operations, one voice frame is being sent every radio frame. The speech frame can be compressed and transmitted in a single OFDM subframe to enable DRX operation in the downlink.

For downlink communications, the user terminals 100 report channel conditions to the scheduler. The scheduler at the base station 20 determines which user terminals 100 to serve based on the reported channel conditions and other factors such as buffer levels, quality of service (QoS) requirements, and fairness considerations. Data is transmitted to the user terminals 100 on the PDSCH. Once a scheduling decision is made, the base station 20 transmits voice packets (shown in black) to the scheduled user terminals 100 on the PDSCH. The identities of the user terminals 100 scheduled to receive data in a given subframe are transmitted in a scheduling message called the Downlink Assignment (DL-A) message on the PDCCH. The DL-A message is normally transmitted in the same subframe as the data transmission. The user terminals 100 monitor the PDCCH to determine when they are being scheduled to receive data on the PDSCH. After receiving data on the PDSCH, the user terminal 100 transmits an acknowledgement (ACK/NACK) to the base station 10 on the PUCCH to indicate whether the data was successfully decoded. The LTE standard specifies that the ACK/NACK signaling must be sent four subframes after the downlink transmission. In the case of an unsuccessful transmission, the user terminal 100 sends a NACK on the PUCCH four subframes after the downlink transmission and continues monitoring the PDCCH for a new DL-A for the retransmission. The retransmission from the base station 20 (shown in black) occurs in the ninth subframe in this example, which is chosen arbitrarily for this example as there is no set time in the LTE standard for the retransmission.

For uplink communications, the user terminal 100 transmits a scheduling request (SR) on the PUCCH to the base station 20 when it has data to transmit. The user terminal 100 then monitors the PDCCH while it waits for an uplink grant (UL-G). Once the UL-G is received, the user terminal 100 transmits voice packets (shown in black) on the assigned resources four subframes following the UL-G. Because the SR contains no information about the resource requirements of the user terminal 100, the user terminal 100 attaches a buffer status report (BSR) to the first uplink transmission. After transmitting the data to the base station 20, the user terminal 100 then monitors the PHICH for an ACK/NACK of the uplink transmission. The LTE standard specifies that the ACK/NACK signaling should be transmitted four subframes following the uplink transmission. In the case of an unsuccessful transmission, the user terminal 100 retransmits the data four subframes following the NACK. Those skilled in the art will appreciate that the retransmission may comprise either the same data originally transmitted, or different data if incremental redundancy is being used.

FIG. 3 illustrates an example of uncoordinated transmissions on the uplink and downlink. In this example, it is assumed that the eNB is using a DRX periodicity equal to the speech frame periodicity (20 milliseconds in this example) and an inactivity timer of 1 sub-frame. After transmitting the uplink service request (SR), the user terminal 100 must turn on its receiver to wait for the uplink grant. The uplink grant is received in the sixth subframe. In the example, it is assumed that the downlink transmission was unsuccessful and that the user terminal 100 thus sends a NACK on the uplink control channel to request a retransmission. The NACK is sent in the fifth subframe, before the uplink grant is received. Therefore, the user terminal 100 must leave its receiver on after receiving the uplink grant to listen for a new downlink scheduling message for the retransmission, which is not received until the ninth subframe. In the tenth subframe, the user terminal transmits a voice packet on the uplink. The user terminal 100 must turn on its receiver four subframes later, i.e., the fourteenth subframe, to listen for the ACK/NACK message. In this example, the user terminal 100 is required to turn on its receiver in a minimum of fourteen subframes, even if the user terminal 100 is operating in the discontinuous reception mode. The user terminal 100 also turns on its transmitter in four subframes out of twenty.

Figure 4:
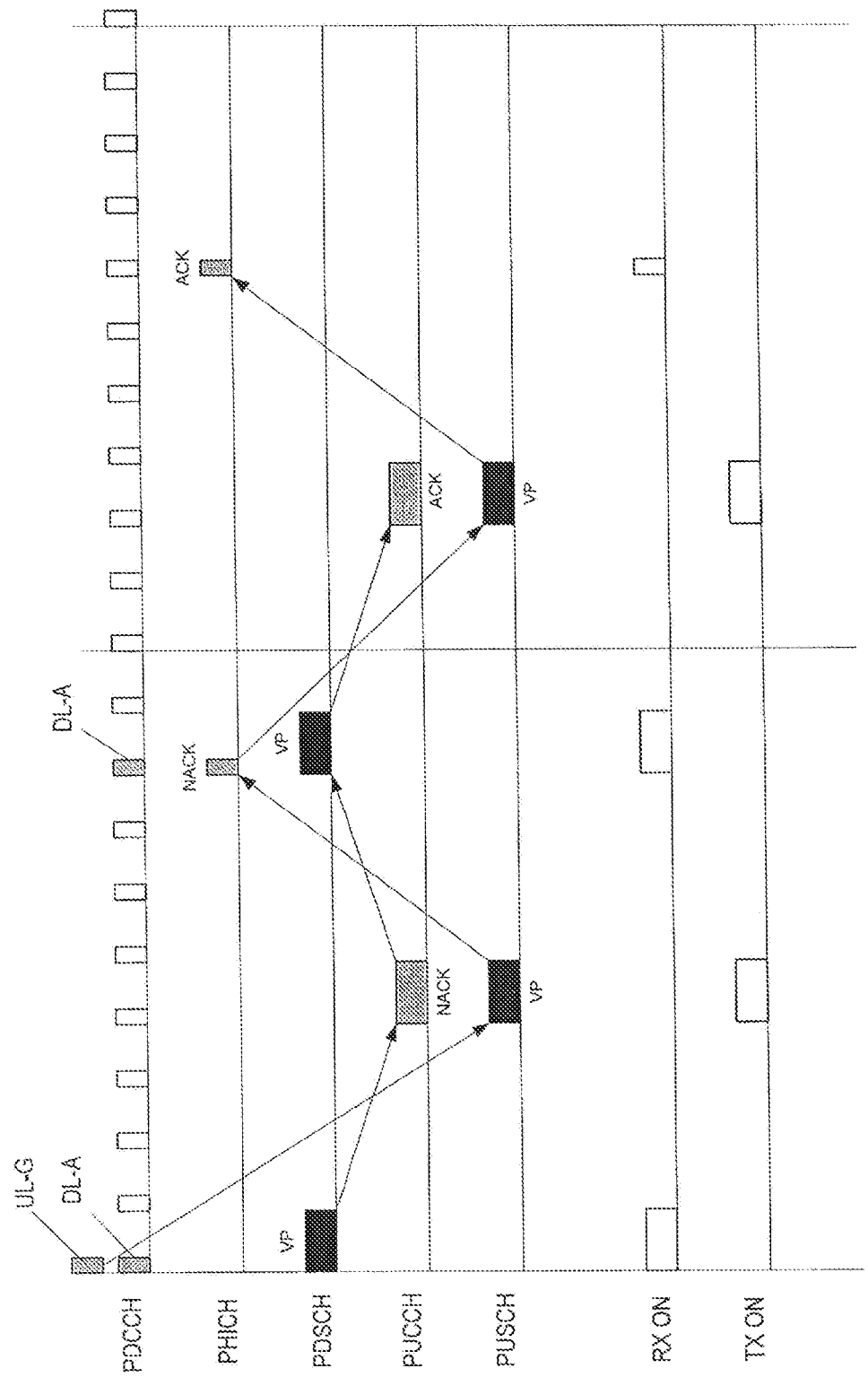
FIG. 4 illustrates typical operations for uplink and downlink communications of a base station and user terminal in a mobile communication system according to one embodiment of the invention. This example shows the transmission and retransmission of one uplink and one downlink voice packet where the retransmission of the downlink packet is aligned with the acknowledgment of the uplink transmission.

FIG. 4 illustrates an example of coordinated transmissions on the uplink and downlink in accordance with one embodiment of the present invention in a scenario where the original uplink and downlink transmissions are unsuccessful. In this example, the base station 20 transmits a downlink voice packet in the first subframe. It is presumed that an either uplink service request has previously been transmitted to the base station 20 by the user terminal 100 on the PUCCH transmitted concurrently with the PUSCH packet from the last speech period. Alternatively, the user terminal 100 could indicate continued uplink voice activity by inserting a Buffer Status Report (BSR) into the PUSCH transmission for the last speech frame. Therefore, the base station 20 transmits an UL-G to the user terminal 100 in the same subframe as the downlink scheduling message. According to the LTE Standard, the downlink transmission occurs in the same subframe as the transmission of the downlink scheduling message. The user terminal 100 is required to transmit an uplink burst in the fourth subframe following the UL-G (i.e., the fifth subframe) Also, the user terminal 100 is required to transmit the ACK/NACK message on the PUCCH in the fourth subframe following the downlink transmission (i.e., the fifth subframe). Thus, the alignment of the downlink scheduling message and the UL-G in the first subframe causes the ACK/NACK message to be transmitted in the same subframe as the uplink burst.

It is assumed in this example that the downlink transmission is not successfully decoded and that the user terminal 100 sends a NACK in the fifth subframe. By standard, the base station 20 is required to transmit an ACK/NACK message four subframes following the uplink transmission (i.e., in the ninth subframe). In a preferred embodiment of the invention, the base station 20 aligns its downlink retransmission with the ACK/NACK message transmitted to the user terminal 100. Consequently, the downlink scheduling message will be aligned with the ACK/NACK message. By standard, the user terminal 100 will acknowledge the retransmission four subframes later (i.e., the thirteenth subframe). Also, because the standard requires the uplink transmission to occur four subframes after the ACK/NACK message from the base station 20, the uplink retransmission will be aligned with the ACK/NACK signal transmitted in the thirteenth subframe.

As shown in FIG. 4, the alignment of the downlink scheduling messages with the uplink grant and ACK/NACK signaling associated with uplink transmissions means that the user terminal will need to turn on its receiver in only slightly more than two subframes in every twenty subframes. In this regard, it may be noted that the receiver needs to be turned on for a short period in the seventeenth subframe to receive the final ACK from the base station 20. Similarly, the user terminal will need to turn on its transmitter in only two subframes out of twenty for the original transmission and retransmission, respectively Thus, significant power savings can be realized enabling the mobile terminal to turn off its transmitter and receiver for substantially longer periods of time as compared to the uncoordinated scenario shown in FIG. 3. For convenience, the mode of operation shown in FIG. 4 is referred to herein as the power save mode.

Figure 5:
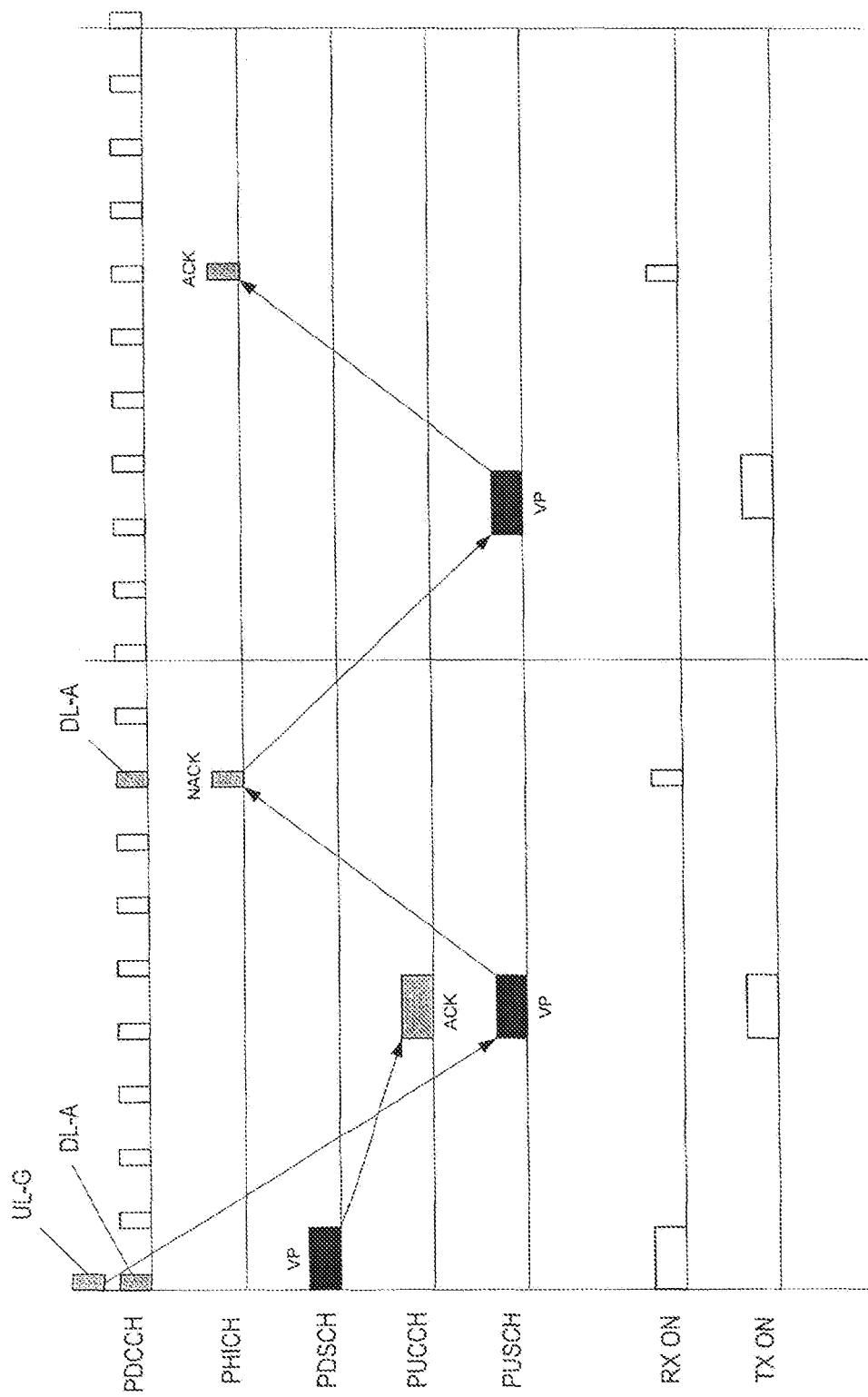
FIG. 5 illustrates typical operations for uplink and downlink communications of a base station and user terminal in a mobile communication system according to one embodiment of the invention. This example shows the transmission and retransmission of one uplink packet and the transmission of one downlink voice packet.

FIG. 5 illustrates coordinated transmissions on the uplink and downlink in the scenario where the downlink transmission is successful so no downlink retransmission is required. As in the previous example, the original downlink scheduling message and the UL-G are transmitted to the user terminal 100 in the first subframe. According to the LTE standard, the downlink transmission occurs in the same subframe as the transmission of the downlink scheduling message. The user terminal 100 acknowledges the downlink transmission in the fifth subframe and transmits the voice packet responsive to the UL-G at the same time.

It is assumed in this example that the downlink transmission is successful and that the user terminal 100 sends an ACK in the fifth subframe. Therefore, there is no retransmission on the downlink. By standard, the base station 20 transmits an ACK/NACK message to the user terminal 100 in the ninth subframe (four subframe following the uplink transmission and the user terminal 100 retransmits in the thirteenth subframe. Because the ACK/NACK message comprises a single bit, the receiver does not need to be turned on for the entire subframe. Thus, additional power savings can be realized when no downlink retransmission is required.

Because the alignment of control signaling for uplink and downlink transmissions is not currently specified by the standard, the base station 20 would likely need to send a control signal to the user terminal 100 to switch the operation of the user terminal 100 from a normal mode as specified in the LTE standard to the power save mode. The user terminal 100 may indicate that it can operate in a power save mode during a handshake procedure when the user terminal establishes communication with the base station 20. The base station 20 may then send a control signal to the user terminal 100 to direct the user terminal to switch from a normal operating mode as shown in FIG. 3 to a power save mode of operation as shown in FIGS. 4 and 5. This signaling to control whether power save mode is being used or not can occur at various times. For instance, it can occur during registration. It can also occur at call setup, for instance, in the SIP INVITE message used to initiate the call. Lastly, the user terminal 100 could learn by observation that the base station 20 was using this invention and autonomously turn on the power save mode based on the assumption that it will continue for at least the remainder of the call.

Figure 6:
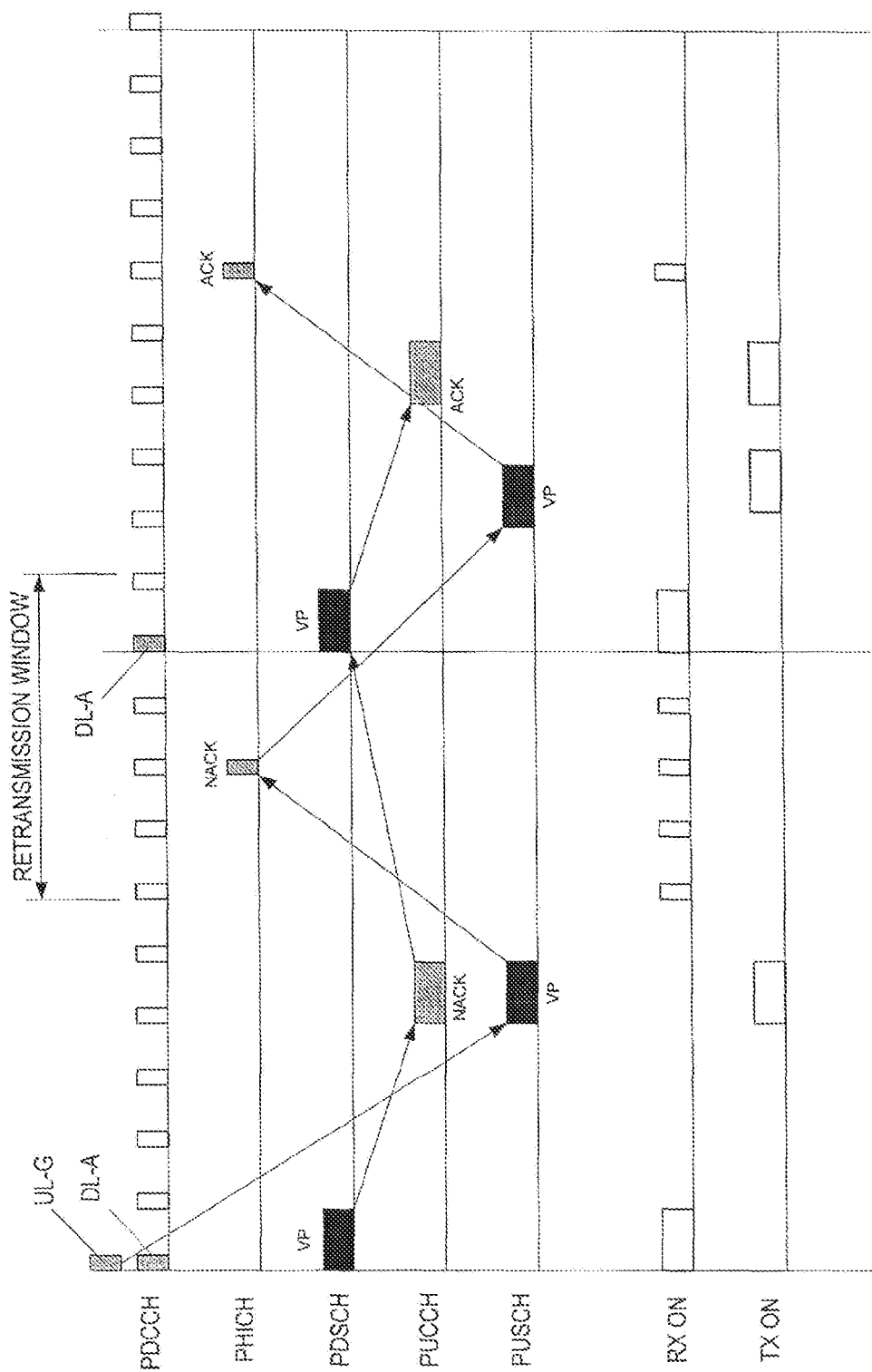
FIG. 6 illustrates typical operations for uplink and downlink communications of a base station and user terminal in a mobile communication system according to another embodiment of the invention. This example shows the transmission and retransmission of one uplink and one downlink voice packet where the retransmission of the downlink packet is not aligned with the acknowledgment of the uplink transmission.

FIG. 6 illustrates operations of the user terminal 100 and base station 20 in accordance with an alternate embodiment of the invention. In this example, the original transmissions of voice packets on the uplink and downlink are both unsuccessful. In this example, the base station 20 transmits a downlink voice packet in the first subframe. It is presumed that an uplink request has previously been transmitted to the base station by the user terminal 100. Therefore, the base station 20 transmits an uplink grant to the user terminal 100 in the same subframe as the downlink scheduling message. According to the LTE Standard, the downlink retransmission occurs in the same subframe as the transmission of the downlink scheduling message. The user terminal 100 is required to transmit an uplink burst in the fourth subframe following the uplink grant (i.e., the fifth subframe). Thus, the alignment of the downlink scheduling message and the uplink grant in the first subframe causes the ACK/NACK message to be transmitted in the same subframe as the uplink burst.

It is assumed that the downlink transmission is not successfully decoded and that the user terminal 100 sends a NACK in the fifth subframe. By the standard, the base station 20 is required to transmit an ACK/NACK message four frames following the uplink transmission (i.e., in the ninth subframe). In contrast to the previous embodiment, the base station 20 is not required to align the downlink retransmission with the acknowledgement message. Instead, the base station 20 specifies a retransmission window during which the downlink retransmission may occur. The retransmission window is defined by two parameters, referred to herein as the offset and the window size. The offset specifies the beginning subframe of the window relative to the subframe in which the user terminal 100 transmitted the NACK message. The window size specifies the length of the window in subframes. In this example, the offset is one subframe and the window size is six subframes.

During the retransmission window, the user terminal 100 turns on its receiver on and off intermittently to listen for a downlink scheduling message. In one embodiment, the receiver is turned on for a fractional portion of each subframe to listen for the downlink scheduling message. Because the PDCCH is transmitted in the first few symbols of a subframe, the receiver needs to be turned on for only a few symbols in subframes where no scheduling message is received. In subframes where a scheduling message is received, the receiver is turned on for the entire subframe to receive the downlink transmission. This technique, referred to herein as microsleeping, allows the user terminal to sleep for short periods of time during each subframe of the retransmission window. Because the PDCCH can vary from one to three symbols in length depending on the exact circumstances in the network and network control settings, it is advantageous for the terminal receiver to detect this variation and to turn off as soon as possible after decoding the PDCCH for which there is no downlink packet assigned. The embodiment shown in FIG. 6 has the advantage of not requiring any additional control signaling other than the DRX control signaling already existing in the LTE standard.

Figure 7:
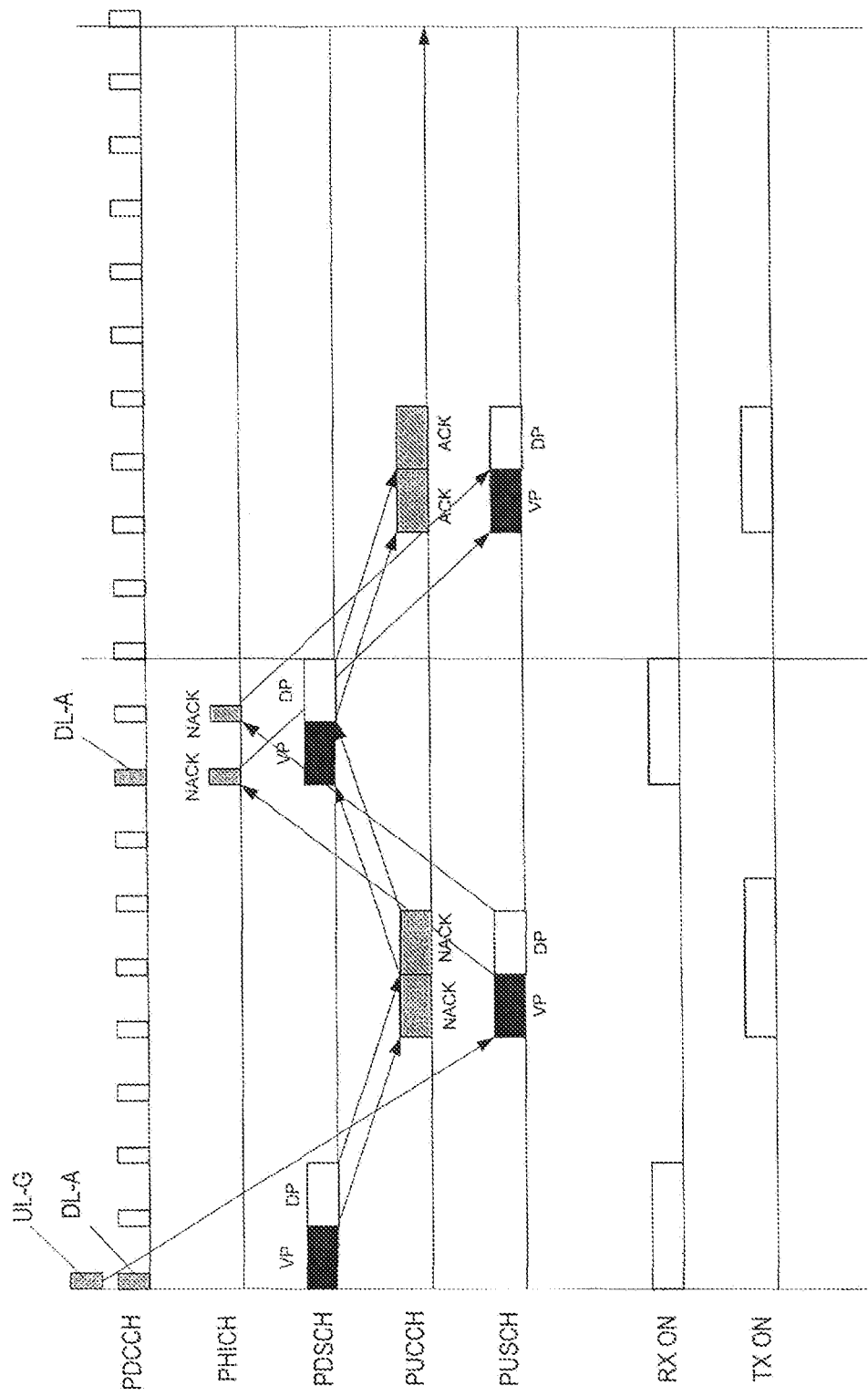
FIG. 7 illustrates typical operations for uplink and downlink communications of a base station and user terminal in a mobile communication system according to another embodiment of the invention. This example shows the transmission and retransmission of one uplink and one downlink voice packet along with an appended data packet.

FIG. 7 shows an alternate embodiment of the invention for handling concurrent voice and data sessions. FIG. 7 illustrates the unsuccessful transmission of one uplink and one downlink voice packet (shown in black), and one uplink and one downlink data packet (shown in white). As in the previous examples, the original downlink scheduling message and the uplink grant are transmitted to the user terminal 100 in the first subframe. The base station 20 transmits a downlink voice packet in the first subframe along with an appended data packet in the second subframe. The user terminal 100, responsive to the uplink grant, transmits a voice packet to the base station 20 in the fifth subframe. At the same time, the user terminal 100 sends a NACK to the base station 20 to indicate that the downlink voice and data packets were not correctly received. An appended data packet is transmitted in the sixth subframe. In this embodiment, the base station 20 aligns the downlink retransmission with the ACK/NACK of the uplink transmission. The base station 20 retransmits the voice and data packet in the ninth and tenth frames respectively and sends an acknowledgement of the uplink transmission at the same time. The user terminal 100 retransmits the voice and data packet in the thirteenth and fourteenth subframes respectively and sends an acknowledgement of the downlink retransmission in the thirteenth subframe.

By transmitting the data packets in the frame immediately following the transmission of the voice packets, the signaling overhead for data transmissions can be reduced. This embodiment avoids the need to have separate signaling for the data packets. Also, those skilled in the art will note that a single acknowledgement message is sent for both the voice and data packets. This may result in the retransmission of some data that has been successfully received. However, the invention may still be useful in situations where the system is lightly loaded.

There may be some times when the system is lightly loaded and the base station does not need all of the available spectrum to provide service to the user terminals 100. According to one aspect of the invention, the scheduler can be programmed to consolidate the downlink transmissions into the fewest possible number of subframes to create "silent" subframes where there are no downlink transmissions. The base station 20 can indicate through signaling the number of subframes being used so that the user terminal 100 do not need to listen for downlink transmissions in the silent subframes.

In another aspect of the invention, the base station 20 may limit the sub-frames that it will listen to for RACH attempts. The base station 20 could indicate the subframes used for RACH transmissions, referred to herein as the RACH window, on a broadcast system information message. This would allow the base station receiver to be off except during the scheduled times using this invention. Also, we should mention that the base station 20 could use a similar "microsleep" technique to listen only to the beginning few symbols of each sub-frame of the RAC window.

Figure 8:
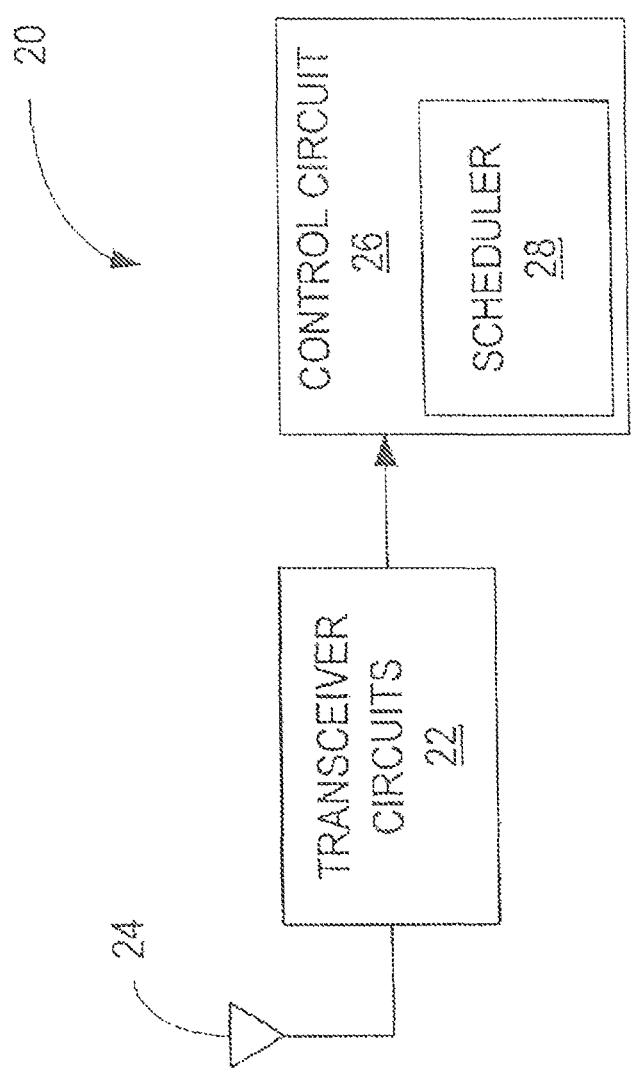
FIG. 8 illustrates an exemplary base station according to the present invention.

FIG. 8 illustrates an exemplary base station 20. The base station 20 comprises transceiver circuits 22 coupled to an antenna 24 for communicating with one or more user terminals 100, and a control circuit 26 for controlling the operation of the base station 20 as described above. The control circuit 26 may comprise one or more processors that carry out the various control functions, such as radio resource control. The control circuit 26 includes a scheduler 28 to schedule uplink and downlink transmissions as described above. The scheduler 28 is responsible for determining which user terminals 100 to schedule for transmission during each subframe and to send a scheduling messages and uplink grants to the scheduled user terminals 100.

Figure 9:
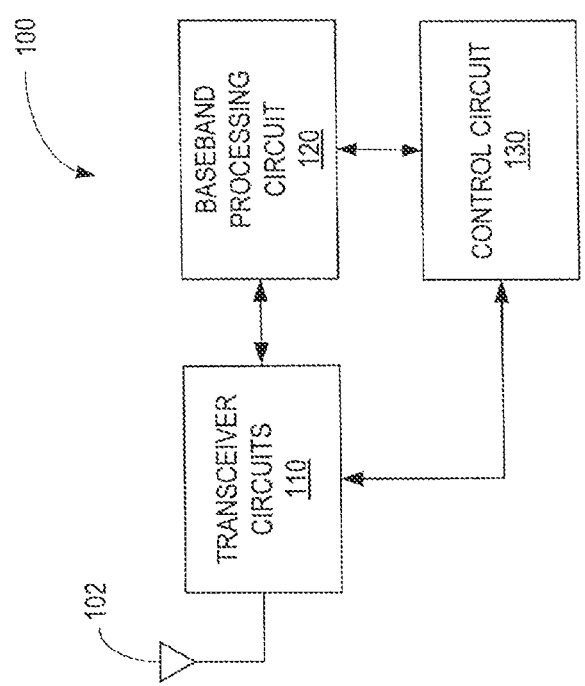
FIG. 9 illustrates an exemplary user terminal according to the present invention.

FIG. 9 illustrates an exemplary user terminal 100. The user terminal 100 comprises a transceiver 110 coupled to one or more antennas 102, a baseband processing circuit 120 for processing signals transmitted and received by the user terminal 100, and a control unit 130 to control the overall operation of the user terminal 100 as described in this application. The baseband processing circuit 120 and control unit 130 could be implemented in a one or more programmable processors and/or hardware circuits.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method implemented by a user terminal of receiving downlink retransmission from a base station over a shared downlink traffic channel, said method comprising:
   transmitting to said base station an uplink message and a negative acknowledgement message with aligned timing, wherein the uplink message is in response to a successfully received uplink scheduling grant and the negative acknowledgement indicates that a previous downlink transmission from the base station was unsuccessful; and
   intermittently turning a receiver circuit on and off for a fractional portion of each subframe in a defined retransmission window comprising a plurality of subframes to listen for a downlink retransmission.

2. The method of claim 1,
   the method further comprises the user terminal receiving an uplink scheduling grant in the same subframe as the user terminal receives a downlink scheduling message,
   wherein said transmitting of the uplink message is in response to a coordinated transmission of the uplink scheduling grant in dependence on the timing of the downlink scheduling message, and
   wherein the downlink scheduling message indicates that the user terminal is scheduled to receive data on the shared downlink traffic channel in corresponding subframes of a radio frame.

3. The method of claim 1, wherein the uplink message and the negative acknowledgement message are transmitted in aligned subframes on an uplink data channel and an uplink control channel, respectively.

4. The method of claim 1, wherein the fractional portion of each subframe is a beginning portion of each subframe.

5. The method of claim 1, further comprising receiving a scheduling message during the fractional portion of one of the subframes and keeping the receiver circuit turned on for a remainder of the subframe.

6. The method of claim 1, further comprising turning the receiver circuit off for each subframe after decoding a PDCCH for which there is no downlink packet assigned.

7. The method of claim 1, further comprising turning off the receiver circuit after a decoded control message is determined to not include a downlink packet assignment for the subframe.

8. The method of claim 1, further comprising turning off the receiver after detecting that a control message is completed and that a downlink packet will not be sent in the subframe.

9. The method of claim 1, further comprising indicating to the base station during a handshake procedure that the user terminal will operate in a power save mode.

10. The method of claim 1, wherein the negative acknowledgement message indicates that a previous downlink transmission of one or more voice or one or more data packets was unsuccessful, and wherein intermittently turning a receiver circuit on and off comprises to listen for a downlink retransmission of the one or more voice and the one or more data packets.

11. A user terminal configured to receive downlink transmission from a base station over a shared downlink traffic channel, said user terminal comprising:
   a transceiver for receiving said downlink transmission and for transmitting control signal on an uplink channel;
   a control circuit configured to:
      transmit to said base station an uplink message and a negative acknowledgement message with aligned timing, wherein the uplink message is in response to a successfully received uplink scheduling grant and the negative acknowledgement indicates that a previous downlink transmission from the base station was unsuccessful;

intermittently turn a receiver circuit on and off for a fractional portion of each subframe in a defined retransmission window comprising a plurality of subframes to listen for a downlink retransmission.

12. The user terminal of claim 11,
wherein the transceiver is configured to receive an uplink scheduling grant in the same subframe as a downlink scheduling message, and
wherein the control circuit is configured to transmit the uplink message in response to a coordinated transmission of the uplink scheduling grant in dependence on the timing of the downlink scheduling message, and
wherein the downlink scheduling message indicates that the user terminal is scheduled to receive data on the shared downlink traffic channel in corresponding subframes of a radio frame.

13. The user terminal of claim 11, wherein the control circuit is configured to transmit in aligned subframes the uplink message and the negative acknowledgement message on an uplink data channel and uplink control channel, respectively.

14. The user terminal of claim 11, wherein the fractional portion of each subframe is a beginning portion of each subframe.

15. The user terminal of claim 11, wherein the transceiver is configured to receive a scheduling message during the fractional portion of one of the subframes and the control circuit is configured to keep the receiver circuit turned on for a remainder of the subframe.

16. The user terminal of claim 11, wherein the control circuit is configured to turn the receiver circuit off for each subframe after decoding a PDCCH for which there is no downlink packet assigned.

17. The user terminal of claim 11, wherein the control circuit is configured to turn off the receiver circuit after a decoded control message is determined to not include a downlink packet assignment for the subframe.

18. The user terminal of claim 11, wherein the control circuit is configured to turn off the receiver after detecting that a control message is completed and that a downlink packet will not be sent in the subframe.

19. The user terminal of claim 11, wherein the user terminal is configured to indicate to the base station during a handshake procedure that the user terminal will operate in a power save mode.

20. The user terminal of claim 11, wherein the negative acknowledgement message indicates that a previous downlink transmission of one or more voice or one or more data packets was unsuccessful, and wherein the control circuit is configured to intermittently turn a receiver circuit on and off to listen for a downlink retransmission of the one or more voice and the one or more data packets.

* * * * *